United States Patent
Ndu et al.

(10) Patent No.: US 12,204,639 B2
(45) Date of Patent: Jan. 21, 2025

(54) MONITORING OPERATING SYSTEM INVARIANT INFORMATION

(71) Applicant: HEWLETT PACKARD ENTERPRISE DEVELOPMENT LP, Houston, TX (US)

(72) Inventors: Geoffrey Ndu, Bristol (GB); Nigel Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 1179 days.

(21) Appl. No.: 16/523,085

(22) Filed: Jul. 26, 2019

(65) Prior Publication Data
US 2021/0026948 A1    Jan. 28, 2021

(51) Int. Cl.
    *G06F 21/54*    (2013.01)
    *G06F 9/455*    (2018.01)
    *G06F 11/30*    (2006.01)
    *G06F 21/12*    (2013.01)
    *G06F 21/56*    (2013.01)

(52) U.S. Cl.
    CPC .......... *G06F 21/54* (2013.01); *G06F 9/45558* (2013.01); *G06F 11/3037* (2013.01); *G06F 21/126* (2013.01); *G06F 21/562* (2013.01); *G06F 21/566* (2013.01); *G06F 2009/45587* (2013.01)

(58) Field of Classification Search
    CPC ...... G06F 21/54; G06F 21/126; G06F 21/562; G06F 21/566; G06F 9/45558; G06F 11/3037; G06F 2009/45587
    See application file for complete search history.

(56) References Cited

U.S. PATENT DOCUMENTS

| | | | |
|---|---|---|---|
| 9,270,697 B2 | 2/2016 | Ghosh et al. | |
| 9,702,727 B2 | 7/2017 | Block | |
| 2009/0217377 A1 | 8/2009 | Arbaugh et al. | |
| 2010/0223447 A1* | 9/2010 | Serebrin | G06F 9/30087 712/225 |
| 2011/0022812 A1* | 1/2011 | van der Linden | H04L 67/1097 711/163 |
| 2011/0082962 A1* | 4/2011 | Horovitz | G06F 11/301 718/1 |
| 2014/0157407 A1* | 6/2014 | Krishnan | G06F 21/50 726/22 |
| 2014/0325644 A1 | 10/2014 | Oberg et al. | |

(Continued)

OTHER PUBLICATIONS

Arm Limited, Architectures—Privilege and Exception Levels, Arm Developer downloaded Jul. 15, 2019 (10 pages).

(Continued)

*Primary Examiner* — Saleh Najjar
*Assistant Examiner* — Devin E Almeida
(74) *Attorney, Agent, or Firm* — Trop, Pruner & Hu, P.C.

(57) ABSTRACT

In some examples, a system executes a monitor separate from an operating system (OS) that uses mapping information in accessing data in a physical memory. The monitor identifies, using the mapping information, invariant information, that comprises program code, of the OS without suspending execution of the OS, the identifying comprising the monitor accessing the physical memory independently of the OS. The monitor determines, based on monitoring the invariant information of the OS, whether a security issue is present.

19 Claims, 5 Drawing Sheets

(56) References Cited

U.S. PATENT DOCUMENTS

| | | | | |
|---|---|---|---|---|
| 2015/0271139 | A1* | 9/2015 | Lukacs | H04L 63/14 |
| | | | | 726/11 |
| 2016/0092678 | A1* | 3/2016 | Probert | G06F 12/1458 |
| | | | | 713/193 |
| 2016/0203088 | A1* | 7/2016 | Tsirkin | G06F 12/109 |
| | | | | 711/6 |
| 2016/0291996 | A1* | 10/2016 | Tsirkin | G06F 12/1009 |
| 2016/0378678 | A1* | 12/2016 | Lemay | G06F 9/45558 |
| | | | | 711/163 |
| 2017/0149801 | A1* | 5/2017 | Schilling | H04L 63/1416 |
| 2017/0249261 | A1* | 8/2017 | Durham | G06F 12/145 |
| 2017/0286694 | A1* | 10/2017 | Swidowski | G06F 12/109 |

OTHER PUBLICATIONS

Azab et al., Hypervision Across Worlds: Real-time Kernel Protection from the ARM TrustZone Secure World, CCS'14, Nov. 3-7, 2014 (13 pages).

Delgado, ResearchGate, Performance implications of System Management Mode, Conference Paper, Sep. 2013 (12 pages).

Guanglu Yan et al., "MOSKG: Countering Kernel Rootkits with a Secure Paging Mechanism," May 26, 2015, pp. 1-23 (online). The Wiley Network, Retrieved from the Internet on May 21, 2019 at URL: <onlinelibrary.wiley.com/doi/full/10.1002/sec.1282>.

Han et al., Myth and Truth about Hypervisor-Based Kernel Protector: The Reason Why You Need Shadow-Box, This paper was presented at Black Hat Asia 2017, Mar. 30-31, 2017, Singapore (13 pages).

Hojoon Lee et al., "A Dynamic Per-context Verification of Kernel Address Integrity from External Monitors," Feb. 20, 2018, pp. 1-29, Computers & Security.

Lazaros Koromilas et al., "GRIM: Leveraging GPUs for Kernel Integrity Monitoring," Sep. 1, 2016, pp. 1-21.

Petroni, Jr., et al., Copilot—a Coprocessor-based Kernel Runtime Integrity Monitor, 2004 (16 pages).

Ricklarabee.Blogspot, Never-Ending Security, Virtual Memory, Page Tables, and One Bit—CVE-2016-7255, Jan. 8, 2017 (22 pages).

Wikipedia, ARM architecture lasted edited Jul. 15, 2019 (37 pages).

Wikipedia, Hypervisor last edited Jun. 19, 2019 (7 pages).

Wikipedia, Page table last edited May 2, 2019 (4 pages).

Wikipedia, PCI Express last edited Jul. 12, 2019 (28 pages).

Wikipedia, System.map last edited on May 13, 2019 (3 pages).

* cited by examiner

MONITORING OPERATING SYSTEM INVARIANT INFORMATION

BACKGROUND

A computer system includes an operating system (OS) that may be subject to attack by malware or other malicious entities. If any portion of the OS is corrupted, then system integrity or security may be compromised.

BRIEF DESCRIPTION OF THE DRAWINGS

Some implementations of the present disclosure are described with respect to the following figures.

Figure 1:
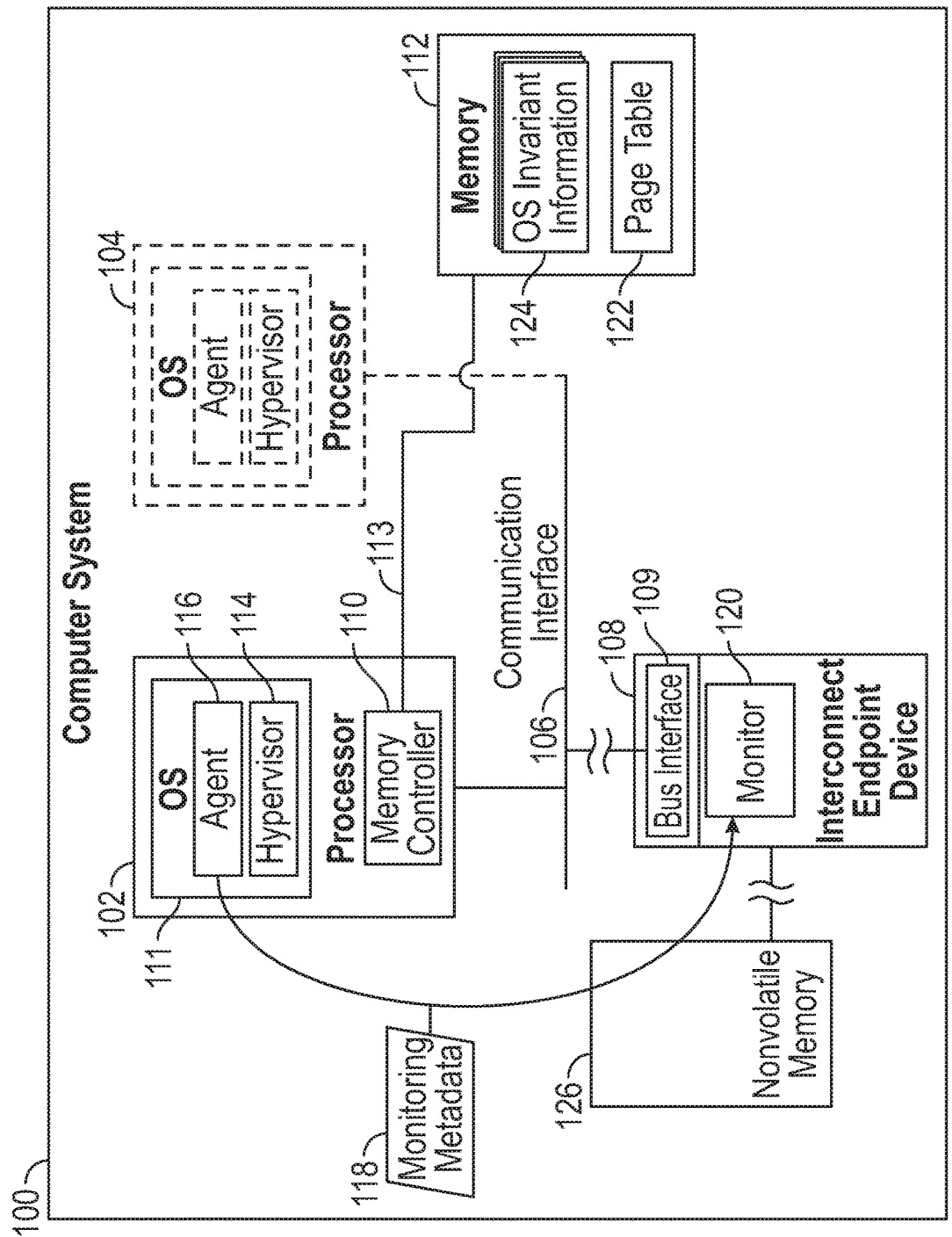
FIG. 1 is a block diagram of a computer system including a monitor for verifying integrity of an operating system (OS), according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, an "operating system" or "OS" includes machine-readable instructions that may be stored in a machine-readable storage medium and executed by a processing resource. An OS may include system software that manages computer hardware and software resources, as well as provides services for computer programs. The OS may facilitate communications between computer hardware and an application program. The OS may include a user interface that allows a user to interact with a computer system. During the setup or initialization of the computer system, an OS may be installed. During the computer system's boot or start-up process, the OS is loaded into a machine-readable storage medium.

The OS may include layers, such as an application layer and a kernel layer. An application program (such as an application program that a user may interact with) may execute at the application layer of the OS. The kernel layer of the OS may include machine-readable instructions that control the computing device's hardware. The machine-readable instructions of the kernel layer may also be referred to as a "kernel." The kernel may manage memory accesses, allocate hardware resources, manage the operating states of a processing resource, manage data of the computing device, and so forth.

As used here, "invariant information" information of the OS includes information that is not be modified during execution of the OS or is to be modified in a predictable or specified manner. If the invariant information is modified in any way or is modified to a value that is not expected, then that indicates something went wrong (e.g., due to malware or other unauthorized actions). The invariant information can include program code (machine-readable instructions), which can include any or some combination of the following: a critical part of the kernel (a part of the kernel considered to be "critical" can be pre-specified), a static part of the kernel (a part of the kernel that is to remain unchanged during execution or should change in a predictable manner), a loadable kernel module (LKM), also referred to as a "driver" of the OS; an executable page of the OS (where the executable page is outside a region of the OS that includes LKMs or drivers); and so forth. In other examples, the invariant information can include other types of information (discussed further below).

Malware or other unauthorized entities may cause modification of invariant information of the OS, which can compromise the integrity or security of the OS. For example, the modified portion of the OS may allow the malware or other unauthorized entity to perform malicious or other unauthorized activities in the computing device, access sensitive data, and so forth.

In the present disclosure, an OS is also considered to include a hypervisor (also referred to as a "virtual machine monitor (VMM)") in examples where a virtualized environment is provided in a computer system. A hypervisor includes machine-readable instructions that are able to run virtual machines (VMs). A VM refers to a virtualized partition of a computer system in which program code (e.g., an application program and/or a guest OS) can execute in a manner that is isolated from execution of program code in the remainder of the computer system, such as in another VM. The hypervisor can manage sharing of the physical resources (including processors, storage devices, network interface controllers, graphics controllers, etc.) among multiple VMs.

In accordance with some implementations of the present disclosure, a monitor is executed in a computer system, where the monitor is separate from an OS of the computer system. The OS uses mapping information (e.g., a page table) to access data in a physical memory of the computing device. The mapping information (e.g., the page table) maps virtual addresses to physical addresses of the physical memory. In other examples, for OS invariant information that is linearly mapped, the mapping information can include a fixed offset. For linearly mapped memory regions, a physical address is obtained by subtracting a virtual address from a fixed offset.

Using the mapping information, the monitor identifies invariant information (including program code) of the OS without suspending execution of the OS and without making a copy of the mapping information for purposes of OS monitoring. The OS invariant information is stored in a physical memory of the computer system, and the monitor is able to access the OS invariant information stored in the memory independently of the OS. In other words, to access the OS invariant information in the physical memory, the monitor does not send requests to the OS to access the physical memory, but rather is able to communicate over an interconnect of the computer system with the physical memory. The ability to access OS invariant information in the physical memory independently of the OS allows for more secure monitoring of the OS invariant information. Thus, even if the OS is compromised by malware or another attack entity, the monitor is still able to effectively perform OS integrity monitoring.

The monitor determines, based on monitoring the invariant information of the OS, whether a security issue is present. If so, the monitor can trigger an alert or a countermeasure to address the security issue.

More generally, monitoring OS invariant information allows the monitor to verify the integrity of the OS. Any unexpected modification of the OS invariant information provides an indication to the monitor that the OS has been compromised, such that a security issue may be present in the computer system hosting the OS.

In accordance with further implementations of the present disclosure, the monitor is also able to verify the integrity of a hypervisor that is part of the OS, in examples where hypervisors are used. To allow a monitor to verify the integrity of the hypervisor, the monitor is a non-hypervisor-based monitor. A non-hypervisor-based monitor is a monitor that does not rely on use of a hypervisor to detect for security issues associated with an OS, which may include the hypervisor in examples where virtualized environments are implemented. Using a hypervisor to detect security issues associated with a hypervisor may be inadequate in cases where the hypervisors are compromised by malware or other entities. Moreover, hypervisor-based OS monitoring techniques may include use of a virtualized infrastructure such as the hypervisor and/or a VM to perform monitoring of the OS, which can increase the complexity associated with verifying the integrity of an OS.

Additionally, hypervisor-based monitoring techniques may suspend execution of an OS that is being monitored to check the integrity of the OS. When the OS is suspended, tasks that rely on operation of the OS may not be able to proceed.

In other examples, monitors may be executed in a privileged execution mode of a processor, such as a system management mode (SMM), an Advanced Reduced Instruction Set Computing (RISC) Machine (ARM) EL3 privilege mode (which is a privilege level reserved for low-level firmware in security code, for example), and so forth. Such monitors that execute in a privileged execution mode may also suspend an OS to perform monitoring of the OS to verify integrity.

Additionally, in some examples, a monitor according to some examples of the present disclosure does not have to make a shadow or duplicate copy of mapping information (e.g., a page table) for OS integrity monitoring. In some examples, a shadow copy of the mapping information (e.g., a shadow page table) may be copied to a VM to allow monitoring of the shadow page table, rather than the original page table, for verifying the integrity of an OS. Making the copy of the mapping information for the purpose of monitoring is inefficient. In accordance with some implementations of the present disclosure, a copy of the mapping information does not have to be made for the purpose of integrity monitoring by the monitor, to improve OS monitoring efficiency.

As used here, making a copy of the mapping information refers to copying the mapping information where the copy of the mapping information is not used by the OS, but rather is used by a monitor for performing OS integrity monitoring. The OS would continue to employ the original mapping information. Copying any portion of mapping information to an intermediate memory, such as a cache memory or other intermediate memory between a secondary memory and a processor, is not considered copying a portion of the mapping of information for OS integrity monitoring for purposes of the present disclosure. In accordance with some implementations of the present disclosure, metadata (discussed further below in connection with FIG. 1) regarding the mapping information is provided to the monitor.

The monitor according to some implementations of the present disclosure is able to perform OS integrity monitoring in real-time. Monitoring the OS in "real-time" can refer to monitoring for attacks on the OS as the OS executes and without having to suspend the OS to check the integrity of the OS. Real-time monitoring of the OS is contrasted to offline monitoring of the OS, where logs relating to execution of the OS can be monitored and analyzed (even if the OS is no longer executing) to verify OS integrity. Also, the real-time monitoring of the OS integrity can be performed without relying on cryptographic signatures computed based on the content of the OS invariant information, in some examples. Computing cryptographic signatures and verifying integrity of the OS based on the cryptographic signatures can involve time-consuming computations, which can add substantial load to the processing resources of a computer system.

FIG. 1 is a block diagram of a computer system 100, which can be implemented as a computer or as multiple computers. A "computer" can refer to a server computer, a notebook computer, a desktop computer, a communication device (e.g., a router, a switch, a gateway, etc.), a wearable device (e.g., a smartwatch, smart eyeglasses, a head-mounted device, etc.), a game appliance, an Internet-of-Things (IoT) device, or any other type of electronic device.

The computer system 100 includes a processor 102. A "processor" can include a microprocessor, a core of a multi-core microprocessor, a central processing unit (CPU), a general processing unit (GPU), a microcontroller, a programmable integrated circuit, a programmable gate array, a digital signal processor, or another hardware processing circuit. In further examples, a "processor" can also refer to a larger electronic device, such as a blade server, or any other type of electronic device that can be mounted onto a platform. For example, the processor 102 may include a blade server mounted IN a server system.

In some examples, the computer system 100 can include multiple processors, such as another processor 104. Each processor 102 or 104 is coupled to a communication interconnect 106 for communication with various other electronic components, including an interconnect endpoint device 108.

Although not shown in FIG. 1, in some examples, a chipset (not shown) may support communications of the processors 102 and 104 and the interconnect endpoint device 108 over the communication interconnect 106. In other examples, the chipset can be omitted.

An interconnect endpoint device can refer to any electronic component that is able to communicate over the communication interconnect 106. The interconnect endpoint device 108 can include a processor, for example. As another example, the interconnect endpoint device 108 can include a management controller such as a baseband management controller (BMC). The interconnect endpoint device 108 can more generally be considered a processor that is separate from the processor 102 or 104 on which an OS being monitored executed.

Note that the processor 102 and/or 104 and the interconnect endpoint device 108 can be mounted on the same circuit board, or can be mounted on separate circuit boards. In further examples, the processor 102 and/or 104 and the interconnect endpoint device 108 can be separate cores of a multi-core microprocessor.

As used herein, a "BMC" is a specialized service processor that monitors the physical state of a computer system using sensors and communicates with a management system through an independent "out-of-band" connection. A "computer system" can refer to a server computer, a user computer, or any electronic device or collection of electronic devices. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup and deployment, system security, and so forth.

In some examples, a BMC can provide so-called "lights-out" functionality for computing devices. The lights out functionality may allow a user, such as a systems administrator to perform management operations on the computer system even if an OS is not installed or not functional on the computer system. Moreover, in some examples, the BMC can run on auxiliary power (e.g., battery power); as a result, the computer system does not have to be powered on to allow the BMC to perform its operations. The services provided by the BMC may be considered "out-of-band" services, since the OS may not be running and in some cases the computer system may be powered off or is not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computer system is in a powered on state.

In some examples, electronic components can communicate over the communication interconnect 106 according to a Peripheral Component Interconnect Express (PCIe) protocol, which is a high-speed serial computer expansion bus standard. In other examples, the communication interconnect 106 can allow electronic components connected to the communication interconnect 106 to communicate according to other protocols, whether standardized protocols or proprietary protocols, such as an InfiniBand protocol, a Cache Coherent Interconnect for Accelerators (CCIX) protocol, a Gen-Z protocol, and so forth.

The interconnect endpoint device 108 includes a bus interface 109 to communicate over the communication interconnect 106.

The computer system 100 includes a memory controller 110, which in examples according to FIG. 1 is part of the processor 102. In other examples, the memory controller 110 can be separate from the processor 102. The memory controller 110 manages access of a physical memory 112 over a memory bus 113. The physical memory 112 can be implemented using a memory device, or alternatively, using multiple memory devices. A memory device can include a dynamic random access memory (DRAM) device, a static random access memory (SRAM) device, a flash memory device, or any other type of memory device.

A requester, such as the processor 102 or 104 or the interconnect endpoint device 108, is able to issue a request (e.g., a write request or a read request) to access the memory 112 over the communication interconnect 106. In response to the request, the memory controller 110 can issue the corresponding memory access commands to the memory 112. The memory access commands can include a write command to write data to the memory 112, or a read command to read data from the memory 112.

The processor 102 executes an OS 111. In some examples where virtualized environments are used, the OS 111 can include a hypervisor 114. In other examples where virtualized environments are not used, the hypervisor 114 can be omitted.

The OS 111 can also include an agent 116 that collects various information that can be used for monitoring OS invariant information, according to some implementations of the present disclosure. The collected information, as collected by the agent 116, is transmitted as monitoring metadata 118 to a monitor 120 that is executed by the interconnect endpoint device 108.

If present, the processor 104 can similarly execute an OS that includes an agent and a hypervisor. The agent executing on the processor 104 can similarly collect various information that can be used for monitoring OS invariant information of the OS executed by the processor 104.

The monitoring metadata 118 can be used by the monitor 120 to access a page table 122 stored in the memory, as well as to access OS invariant information 124 stored in the memory 112. Note that a "page table" as used herein can refer to a singular page table, or a set of page tables, such as page tables arranged at multiple levels indexed by different parts of a virtual address.

The monitoring metadata 118 that is transmitted from the agent 116 to the monitor 120 can be stored in a nonvolatile memory 126, which is accessible by the interconnect endpoint device 108. A nonvolatile memory can refer to a memory that does not lose its content when power is removed from the nonvolatile memory or from the computer system 100.

Although not shown in the example of FIG. 1, the interconnect endpoint device 108 can be coupled to the nonvolatile memory 126 and to the communication interconnect 106 through a communication switch or other intermediate device. In other examples, the interconnect endpoint device 108 can be connected directly to the communication interconnect 106 and/or to the nonvolatile memory 126.

The monitor 120 uses virtual addresses contained in the monitoring metadata 118 to look up physical addresses in the page table 122 (which maps the virtual addresses to the physical address). The virtual addresses included in the monitoring metadata 118 can include virtual addresses of OS invariant information to be monitored. The physical addresses returned by the page table 122 in response to the virtual addresses presented by the monitor 120 to the page table 122 are addresses of memory locations that contain the OS invariant information 124.

In some examples, virtual address-physical address translations based on the page table 122 can be performed using hardware, such that the virtual address-physical address translations are independent of the OS executing on the processor 102 or 104. As a result, the monitor 120 is generally OS neutral in the sense that memory locations storing the OS invariant information 124 can be derived from the page table 122 independently of the type of OS employed in the computer system 100.

The monitor 120 is presented information regarding a boundary (which can be provided in the monitoring metadata 118) between a user space and a kernel space in the memory address space of the memory 112. Once the boundary is known to the monitor 120, the monitor 120 can use the page table 122 to access memory locations in the kernel space containing the OS invariant information 124 to monitor the OS invariant information 124, for determining whether a security issue is present in the computer system 100.

In some examples, certain OS invariant information 124 is stored in a memory region that is linearly mapped. With a linearly mapped memory region, a physical address is obtained by subtracting a virtual address from a fixed offset. The fixed offset can be part of the monitoring metadata 118.

If the monitor 120 determines based on the monitored OS invariant information 124 that a security issue is present, then the monitor 120 can provide an indication of the presence of the security issue. The indication can be in the form of an alert sent by the monitor 120 to a specified target, such as a human administrator or other user, another entity in the computer system 100, or any system that handles security events. The entity to which the alert is sent can execute countermeasures to address the security issue. For example, the countermeasures can include shutting down the computer system 100, disabling the OS 111, updating or fixing the OS 111, launching an anti-malware program, and so forth.

In examples where the monitor 120 is implemented on a BMC, the BMC can execute countermeasures in response to a detected security issue.

Figure 2:
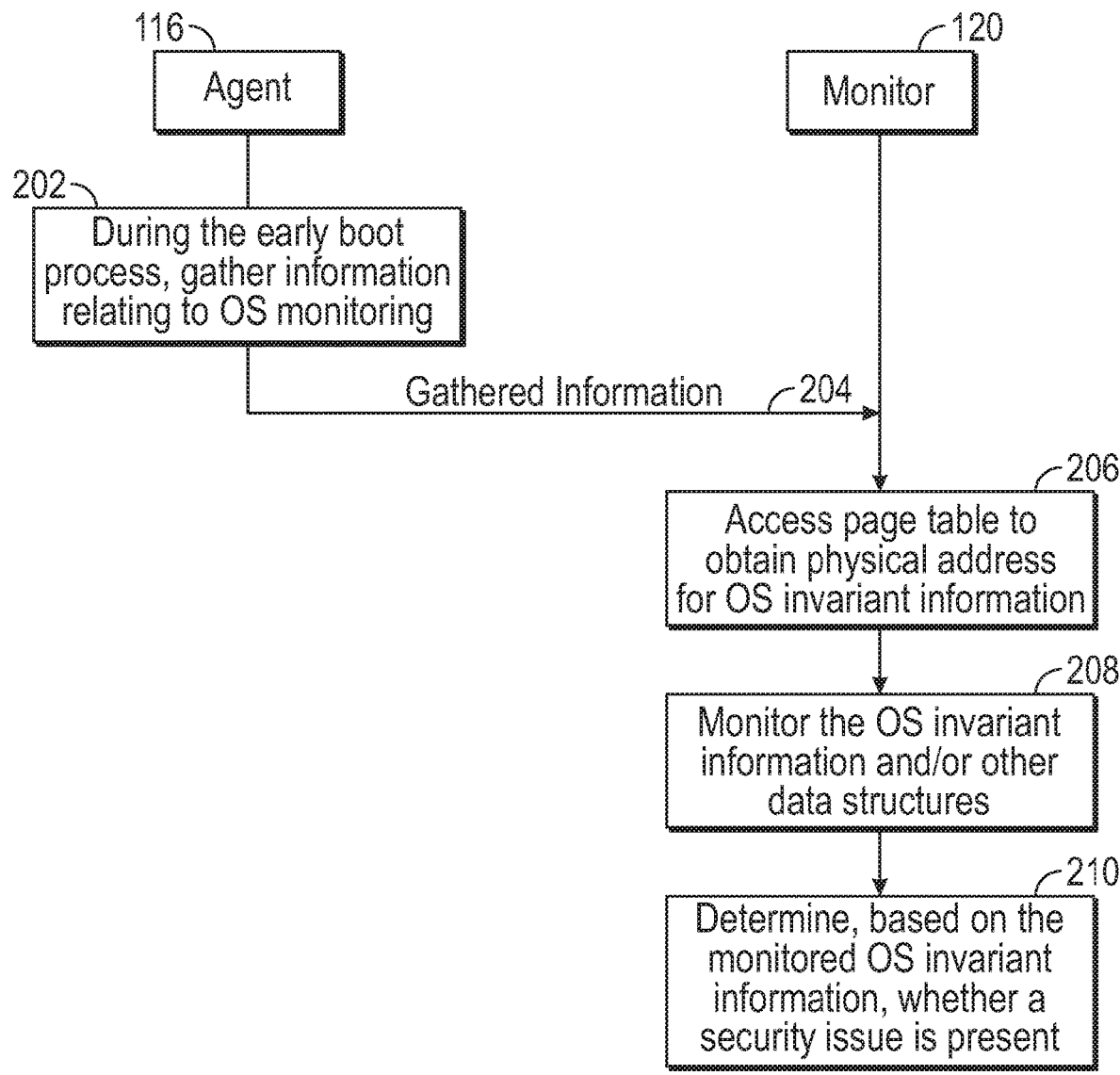
FIG. 2 is a flow diagram of a process according to some examples.

FIG. 2 is a flow diagram of an example process that can be performed by the agent 116 and the monitor 120 that are run on separate processors, according to some examples.

The agent 116 is launched during an early boot process. "Early boot" can refer to the part of a boot of the computer system 100 prior to the OS 111 setting up the user space, or otherwise allowing loading of machine-readable instructions that may not be secure (i.e., may be compromised by malware or other attack entity).

During the early boot process, the agent 116 gathers (at 202) information related to OS monitoring. The agent 116 sends (at 204) the gathered information to the monitor 120. The gathered information that is sent includes the monitoring metadata 118 of FIG. 1, for example.

Sending the gathered information to the monitor 120 can include writing the gathered information to the nonvolatile memory 126 of FIG. 1, for example, or any other type of transmission of information between the agent 116 and the monitor 120.

The monitor 120 accesses (at 206) the page table 122 using the gathered information to obtain physical addresses for OS invariant information to be monitored. For example, the gathered information can include virtual addresses of the OS invariant information. The virtual addresses of the OS invariant information can be provided to the page table 122, and the monitor retrieves, based on the access of the page table 122, respective physical addresses of memory locations in the memory 112 where the OS invariant information 124 is stored.

The monitor 120 monitors (at 208) the OS invariant information (retrieved from the memory locations of the physical addresses obtained by the monitor 120 by accessing the page table 122) and/or other data structures.

The monitor 120 determines (at 210), based on the monitored OS invariant information and/or other data structures, whether a security issue is present in the computer system 100.

Agent 116

In some examples, the agent 116 can include a loadable kernel module (LKM) that is loaded as part of the early boot process. An LKM can include an object file to extend a kernel of an OS. An LKM can also be referred to as a driver. In other examples, the agent 116 can be implemented using other types of program code.

It can be assumed that the OS 111 has not been tampered with at the stage when the agent 116 is loaded, especially if a secure boot or another boot process with a protection mechanism is employed.

Examples of information that can be gathered by the agent 116 is discussed below. Although specific examples are provided below, it is noted that the agent 116 can gather other types of information in other examples.

Moreover, the monitoring metadata 118 provided by the agent 116 can include other example information discussed elsewhere in the present disclosure.

Physical Address of Page Table

A type of information gathered by the agent 116 can include a physical address relating to the page table 122. For example, the physical address can include a physical address for root kernel master page tables. An OS kernel can maintain a set of page tables for its own use. The set of page tables may be rooted at a so-called master kernel Page Global Directory. After system initialization, this set of page tables is present in the memory 112, and is inaccessible to a process or thread that is outside the OS kernel. As an example, the physical address may be available at runtime in a global symbol inside the kernel.

The physical address is loaded by an initial kernel process (Process 0) in a page table base register that controls the processor's hardware page table walker. Generally, the register holds the physical address of the root or the first-level page translation table. The page table 122 can have multiple levels that are walked in response to a virtual address to retrieve the corresponding physical address.

Virtual Memory Map

Another type of information gathered by the agent 116 can include a virtual memory map, which is a data structure that provides information pertaining to the layout of information stored in the memory 112.

The monitor 120 can use the virtual map to determine if a memory address or memory region is being used in a manner prescribed by the OS kernel. For example, the virtual memory map can identify memory regions that are unused (or reserved), and memory regions to store respective types of information. The virtual memory map can include a starting virtual address and an ending virtual address that defines a respective memory region.

Virtual Addresses of Dynamically Allocated Symbols

Another type of information that can be gathered by the agent 116 includes a virtual address of dynamically allocated symbols that contain program code and data structures that are considered to be critical. As examples, the dynamically allocated symbols can include a LINUX Init_Task, which is a root or parent of processes or tasks executing on a LINUX OS (assuming the OS 111 is a LINUX OS).

Other examples of dynamically allocated symbols include a LINUX process list (which lists the processes running in the Linux OS), a LINUX module list (which lists the LKMs of the LINUX OS), and so forth. Although reference is made to a LINUX OS as an example, in other examples, other types of OSs can be employed.

In addition, the agent 116 can also gather process data structures for processes, where an example process data structure can include a memory layout of data for a process.

Virtual Addresses of Core and Static Parts

Another type of information that can be gathered by the agent 116 include virtual addresses of static parts of the OS kernel. Static parts of the OS kernel should not change under normal circumstances or should change in a predictable manner. For example, if a certain feature of the OS kernel is enabled, then a static part of the OS kernel relating to the feature may be changed in a predictable manner to indicate that the feature is enabled (e.g., a flag may be set to indicate that the feature is enabled).

Examples of static parts of the OS kernel (such as for a LINUX OS) can include kernel read-only data and code, a page frame of a Global Descriptor Table (GDT), an Interrupt Descriptor Table (IDT), and so forth.

Physical Address of Kernel Gage Frame Management Data Structure

Another type of information that can be gathered by the agent 116 includes a physical address of a kernel page frame management data structure. A page frame is the smallest fixed-length contiguous block of the memory 112 into which memory pages are mapped by the kernel. Kernels track the current status of each page frame so that they can be able to distinguish the page frames that currently belong to processes from those that contain kernel code and data structures.

An OS can maintain a data structure to track the page frames. As examples, if the OS is a LINUX OS, the tracking data structure is referred to as "struct page." If the OS is a WINDOWS OS, then the tracking data structure can be referred to as a Page Frame Number (PFN) Database. The monitor 120 can use the tracking data structure to determine if a page frame is being used as prescribed by the kernel.

Monitor 120

Since the monitor 120 runs on a processor (108) that is separate from the processor 102 or 104 running the OS being monitored, the monitor 120 does not have to suspend the monitored OS. Not suspending the OS can reduce overhead associated with OS integrity monitoring.

To access OS invariant information to be monitored, the monitor 120 obtains the corresponding physical addresses of the OS invariant information from the page table 122 using virtual addresses supplied in the monitoring metadata 118. The monitor 120 can then send a memory read request packet to the memory controller 110 over the communication interconnect 106 with a physical address (and size) of the memory region to be accessed. The memory controller 110 responds to the memory read request with the data retrieved at the physical address.

The following are examples of integrity monitoring that can be performed by the monitor 120.

Integrity of Kernel Parts

The monitor 120 can monitor an integrity of a critical or static part of an OS kernel.

In some examples, the critical or static parts of the OS kernel can be stored in memory regions that are mapped in a linear fashion (linearly-mapped kernel parts), e.g., an equivalent physical address is obtained by subtracting a virtual address from a fixed offset. For a linear mapped kernel part, the monitor 120 can compute the equivalent physical address by subtracting the virtual address from the fixed offset. The monitor 120 then uses the physical address to fetch the memory content (containing the kernel part to be monitored) of the memory 112 by sending a request to the memory controller 110 over the communication interconnect 106.

To establish a baseline for a given kernel part, the monitor 120 can compute a baseline value based on the content of the given kernel part at a time when the kernel part is known to not be compromised, such as during an early boot process (such as during initial loading of the OS in the computer system 100). As an example, the monitor 120 can compute a hash of the content of the given kernel part, to produce a baseline hash value.

A hash can be based on use of a cryptographic hash function, which may include machine-readable instructions. The cryptographic hash function may include machine-readable instructions that, when executed by a processor, may receive an input. The cryptographic hash function may then generate an output corresponding to the input. Any change to the input may alter the output produced by the cryptographic hash function. The cryptographic hash function may include a secure hash function (SHA), any federal information processing standards (FIPS) approved hash function, any national institute of standards and technology (NIST) approved hash function, or any other cryptographic hash functions.

At a later time (after the OS has executed for some amount of time), the monitor can re-compute another value (e.g., another hash value) based on the content of the kernel part. The re-computed value can be compared by the monitor 120 to the baseline value. If the re-computed value does not match the baseline value (or the re-computed value deviates from the baseline value by more than a specified amount), then the monitor 120 can indicate presence of a security issue.

Note that the re-computation of the value based on the content of the kernel part can be re-iterated multiple times and compared to the baseline value for verifying integrity of the kernel part.

For those parts of the kernel that are in the regions of memory that are not linearly mapped, the monitor 120 uses the page table 122 to translate a virtual address to the appropriate physical address just as the kernel would have done.

Integrity of LKMs

In further examples, the monitor 120 can monitor LKMs (also referred to as drivers). The monitor 120 can obtain a virtual address of an LKM from the monitoring metadata 118, and look up a corresponding physical address where the LKM is stored in the memory 112 from the page table 122.

The monitor 120 can calculate a baseline value (e.g., a hash value) based on the content of the LKM retrieved from the memory 112 at the physical address (such as during early boot of the OS to be monitored), and subsequently, the monitor 120 can re-calculate a value based on the content of the LKM retrieved from the memory 112 at the physical address, and compare the re-calculated value to the baseline value to verify the integrity of the LKM.

Note that the re-computation of the value based on the content of the LKM can be re-iterated multiple times and compared to the baseline value for verifying integrity of the LKM.

In some examples, the monitor 120 can also record the number of executable pages in the physical memory's LKM region. An executable page(s) can refer to a page having a page content that can be executed as program code.

The recorded number of executable pages can be used for detecting whether LKMs have been added or removed, based on detecting a change in the number of executable pages in the LKM region.

Detecting New LKMs

The monitor 120 can continually scan the LKM region of the memory 112 (where the LKM region is identified in the virtual memory map of the monitoring metadata 118, for example). The virtual memory map may specify a virtual address range of the LKM region in the memory 112. The monitor 120 looks up the physical address range(s) corresponding to the virtual address range using the page table 122.

Adding and removing an LKM will change the number of executable pages in the LKM region, which was recorded by the monitor 120 during initial monitoring of the LKM region of the memory 112.

The monitor 120 can verify the integrity of any new LKM by comparing a value (e.g., a hash value) computed based on the content of the new LKM against a pre-loaded list of values (e.g., hash values) for approved LKMs. Alternatively, the monitor 120 can send the value computed based on the content of a new executable page to an external verification server or other entity, which can check the integrity of the new LKM code.

The monitor 120 can determine that an attack is occurring responsive to detecting that the new executable code is corrupted based on the metadata (as discussed above), or alternatively, detecting that the new executable code is within or outside of a specified virtual address region. For example, the virtual memory map can specify that executable code should be only in specific address regions or should not be in specific address regions.

Detecting a New Executable Gage

Under normal circumstances (e.g., in the absence of an update or fix of the OS kernel), the number of executable pages in the OS kernel should not change once the OS completes booting. The monitor 120 can determine based on the monitoring metadata 118 (e.g., the virtual memory map) the virtual address range(s) of memory regions in the memory 112 that store(s) executable pages. Note that the executable pages can include LKMs as well as non-LKM code.

The monitor 120 looks up the corresponding physical address range(s) by accessing the page table 122, and monitors the executable pages in the memory regions and the corresponding page frames to which the executable pages map.

The monitor 120 can determine if the number of executable pages has changed and whether the executable pages still map to their corresponding page frames. As noted further above, the mapping of executable pages to corresponding page frames may be maintained by a tracking data structure referred to as "struct page" for a LINUX OS, or an PFN Database for a WINDOWS OS.

If the number of executable pages change or do not map to their corresponding page frames as indicated by the tracking data structure, then the monitor 120 can indicate that a security issue is present in the computer system 100.

Verifying Page Table Mappings of Kernel and User Processes

Each process (user process or kernel process) in a kernel has a process descriptor, such as a task_struct for a LINUX OS or an EPROCESS data structure for a WINDOWS OS. User space code executes in the user space of a process, and certain actions (e.g., a system call) of the user space code may trigger the execution of kernel code in the kernel space of the process. A kernel process executes only in kernel space.

The process descriptor contains information of a respective process. For example, a process descriptor can contain the physical address of the Page Global Directory (if a LINUX OS is used) of the process, which is the root of the process page tables, among other information. The "process page tables" refer to a set of page tables used by a process.

Figure 3:
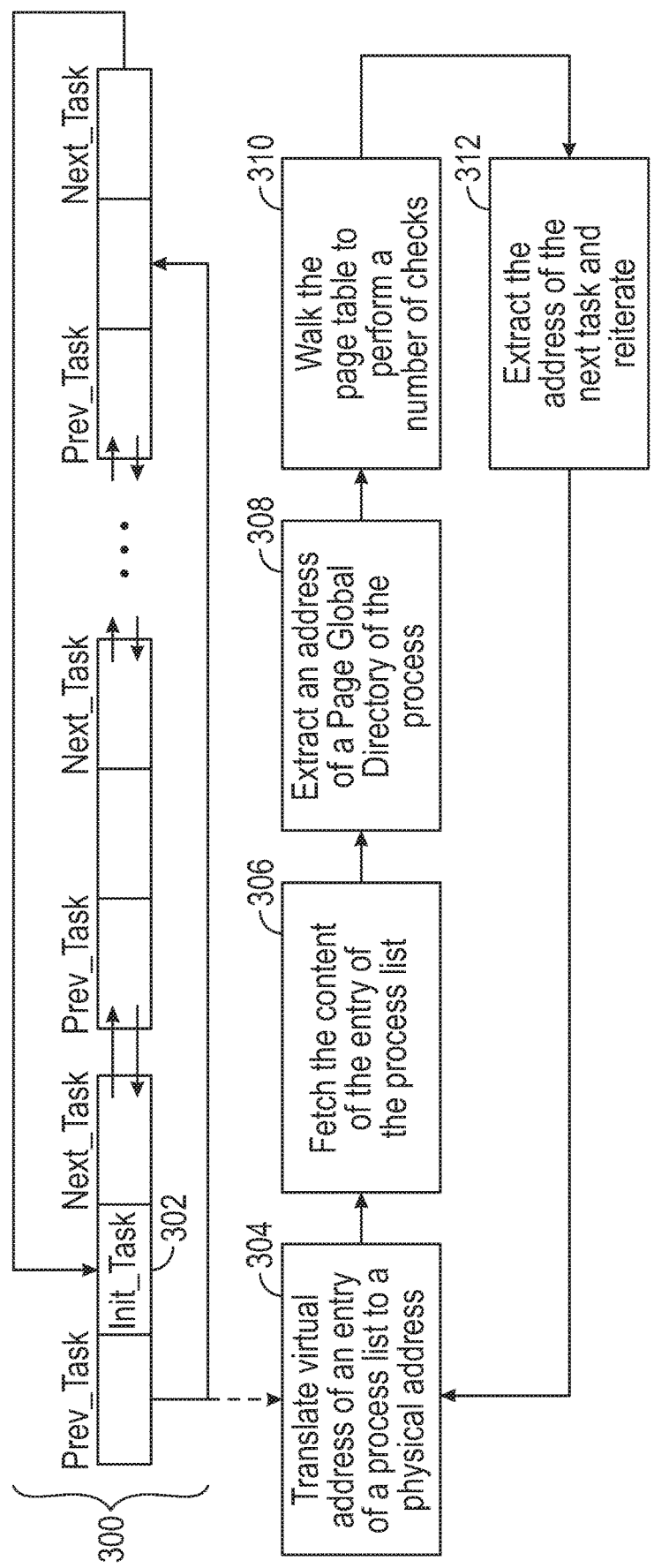
FIG. 3 is a flow diagram of using a process list to perform OS integrity verification according to some examples.

The process descriptors of the OS are managed with a list referred to as a process list. With a LINUX OS for example, a process list 300 is a circular doubly linked list, as shown in FIG. 3. This circular doubly linked list may be referred to as the all-tasks list for LINUX.

The head of the process list 300 is the ancestor of all the tasks of the process, and is referred to as an Init_Task descriptor 302 in LINUX. Information of the Init_Task descriptor can be supplied in the monitoring metadata 118 by the agent 116.

In the process list 300, each entry has a Next_Task pointer to point to the next task in the process, and a Prev_Task pointer to point to a previous task in the process. The Next_Task pointer of the last entry of the process list 300 refers to the head of the process list 300, and the Prev_Task pointer of the head of the process list 300 refers to the last entry of the process list 300.

The following refers to a procedure (depicted in FIG. 3) for verifying a page table mapping of a process. Using the page table 122, the monitor 120 translates (at 304) the virtual address of an entry of the process list 300 into a physical address. Initially, the entry is the head of the process list 300. The virtual address of the head of the process list 300 is supplied by the agent 116 in the monitoring metadata 118.

Using the physical address, the monitor 120 fetches (at 306) the content of the entry of the process list 300, by sending a request over the communication interconnect 106 to the memory controller 110, and receiving the content of the entry of the process list 300 in a response from the memory controller 110.

Using the memory layout of the process descriptor, supplied by the agent 116 in the monitoring metadata 118, the monitor 120 extracts (at 308) an address of the Page Global Directory of the process from the process descriptor.

The monitor 120 walks (at 310) the page table of the process (derived from the Page Global Directory) to perform a number of checks, which are discussed further below.

The monitor 120 then extracts (at 312) the address of the next task (in the next entry of the process list 300) from the process descriptor and elements 304, 306, 308, and 310 are reiterated for the next task.

The monitor 120 may randomly select tasks of a process to verify to reduce resource consumption.

Note that the monitor can also parallelize verification of multiple tasks of a process.

Examples of checks that can be performed at 310 can include any or some combination of the following.

The monitor 120 can check for malicious page table permissions. For example, if the OS is a WINDOWS OS and an entry in the topmost page table level of the page table hierarchy (a page table arranged in multiple levels) is marked as having a user privilege rather than a supervisor privilege, then the page table entry may have been compromised by malware or another attack entity. Normally, a page table entry in the topmost page of the page table hierarchy has a supervisor privilege. Malware or another attack entity may change the privilege level of the page table entry to a user privilege to make a change to the page table entries and the memory they manage.

Other checks of a page table entry that can be performed include determining if the page table entry is marked as executable (exclusive) or writable. If so, that may have been done by malware, such that a security issue is present. A page table entry should be read-only, and should not be executable.

The monitor 120 can verify that a kernel process does not have user space mappings. A user space mapping resides in user space. A kernel process should normally use a mapping residing in kernel space. A kernel process that relies on a user space mapping is likely compromised.

The monitor 120 verifies that there is no mismatch between a process's kernel page tables and root kernel master page tables, such as due to a difference in the number of executable pages.

Detecting Hidden Processes

Some malware relies on the fact that process accounting utilities such as "ps" and the kernel's process scheduler (which schedules processes for execution) may consult different process lists to hide malicious processes (these processes are referred to as "hidden processes").

Note that the process lists may be different but the process descriptors themselves are not. In LINUX for example, the process descriptors of the running processes are linked together with a circular doubly linked list referred to as the all-tasks list (this is the process list 300 shown in FIG. 3). This list contains process descriptors headed by the first process created at the computer system 100, and is used by process accounting utilities.

However, the process scheduler (part of the kernel that decides which process runs at a certain point in time) uses a different list, referred to as a run-list for LINUX, to schedule processes for execution.

Malware process hiding involves unlinking the process descriptor of a malicious process from the all-tasks list but not from the run-list. This ensures that the malicious process is not visible to process accounting utilities but that the malicious still gets scheduled for execution by the kernel. This type of attack is often referred to as a non-control data or Direct Kernel Object Manipulation (DKOM) attack.

The monitor 120, using the page table 122, can detect hidden processes by looking for processes that are in the run-list (more generally, a scheduler list of processes to be scheduled for execution) but not in the all-tasks list (more generally a list of all processes in the computer system 100).

Note that the WINDOWS OS also uses two lists of processes, one for scheduling and another for tracking and process accounting. A similar check for hidden malicious processes can be performed using these two lists.

Verifying Other System Invariants

The monitor 120 can, in addition to monitoring OS invariant information at memory locations determined from a page table, further monitor other types of OS invariant information, such as data pointers, function pointers, etc. Examples of data pointers include the Next_Task and Prev_Task pointers in FIG. 3. The values of these data pointers should not change. If the monitor 120 detects a change in value of a data pointer, then the monitor 120 can indicate a security issue.

Examples of Function Pointers

```
struct seq operations {
    void * (*start) (struct seq file *m, loff t *pos);
    void (*stop) (struct seq file *m, void *v);
    void * (*next) (struct seq file *m, void *v, loff t *pos);
    int (*show) (struct seq file *m, void *v);
};
```

*start, *m, and any other variable with a "*" in front of it are examples of function pointers. The monitor 120 can check the function pointers to ensure that their values do not change.

Further Implementations

Figure 4:
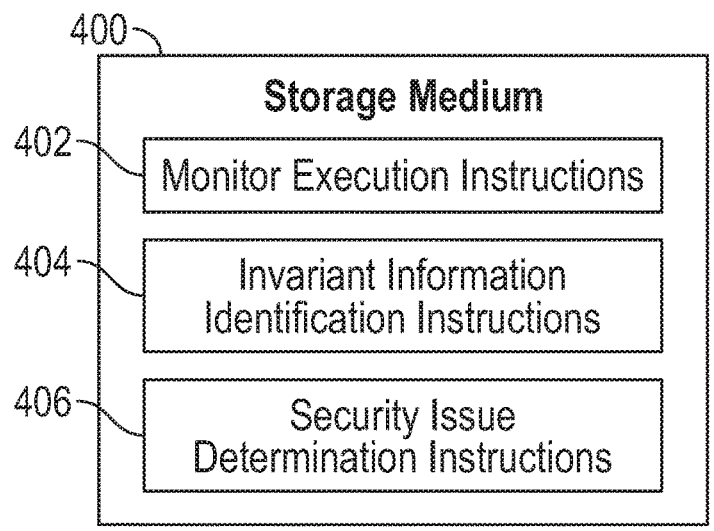
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include monitor execution instructions 402 to execute a monitor (e.g., 120 in FIG. 1) separate from an OS (e.g., 111 in FIG. 1) that uses mapping information (e.g., 122 in FIG. 1) in accessing data in a physical memory (e.g., 112 in FIG. 1). The mapping information maps virtual addresses to physical addresses of the physical memory.

The machine-readable instructions further include invariant information identification instructions 404 to identify, by the monitor using the mapping information, invariant information (including program code and/or other information), of the OS without suspending execution of the OS. The identifying performed by the invariant information identification instructions 404 include accessing the physical memory independently of the OS. For example, the monitor is able to access memory locations in the physical memory containing the invariant information without sending memory access requests to the OS.

The machine-readable instructions include security issue determination instructions 406 to determine, by the monitor based on monitoring the invariant information of the OS, whether a security issue is present.

In some examples, executing the monitor separately from the OS includes executing the monitor on a first processor and executing the OS on a second processor.

In some examples that may be in combination with any of the foregoing aspects, the OS includes a hypervisor, and the determining of whether a security issue is present includes determining whether the security issue is present with the hypervisor.

In some examples that may be in combination with any of the foregoing aspects, the monitor is a non-hypervisor-based monitor.

In some examples that may be in combination with any of the foregoing aspects, the identifying of the invariant information is performed without making a copy of the mapping information.

In some examples that may be in combination with any of the foregoing aspects, the machine-readable instructions include instructions to detect an attack on the mapping information.

In some examples that may be in combination with any of the foregoing aspects, the detecting of the attack of the mapping information is based on detecting that an entry of the mapping information has a privilege level different from a predetermined privilege level (e.g., supervisor privilege) or that the entry of the mapping information has a mode (writable and/or executable) different from a predetermined mode (read-only and/or non-executable).

In some examples that may be in combination with any of the foregoing aspects, the machine-readable instructions include instructions to receive, by the monitor from an agent, metadata indicating a storage location of the mapping information.

In some examples that may be in combination with any of the foregoing aspects, the agent is part of the OS.

In some examples that may be in combination with any of the foregoing aspects, the machine-readable instructions include instructions to access, by the monitor, the mapping information using a virtual address in the metadata, the virtual address related to the invariant information; receive, by the monitor, a physical address translated by the mapping information to the virtual address; and access, by the monitor, a memory location specified by the physical address to retrieve the invariant information of the OS.

In some examples that may be in combination with any of the foregoing aspects, the access of the memory location comprises the monitor accessing the physical memory directly over an interconnect independently of the OS.

In some examples that may be in combination with any of the foregoing aspects, the metadata includes a virtual memory map that indicates portions of a virtual address space that are assigned for respective uses by the OS, and the determining of whether the security issue is present is further based on the virtual memory map.

In some examples that may be in combination with any of the foregoing aspects, the metadata includes a virtual address of critical information of the OS or of static information of the OS, where the invariant information monitored by the monitor includes the critical information or the static information.

In some examples that may be in combination with any of the foregoing aspects, the metadata includes a page frame management data structure including information for page frames, where the invariant information monitored by the monitor includes a page frame.

In some examples that may be in combination with any of the foregoing aspects, the machine-readable instructions include instructions to detect new executable code, determine that an attack is occurring responsive to detecting that the new executable code is corrupted based on the metadata, or detecting that the new executable code is within or outside of a specified virtual address region.

In some examples that may be in combination with any of the foregoing aspects, the determining of whether the security issue is present includes comparing a hash value of the invariant information at runtime of the OS to a baseline hash value of the invariant information.

In some examples that may be in combination with any of the foregoing aspects, the machine-readable instructions include instructions to use a process descriptor to verify an integrity of an OS process.

In some examples that may be in combination with any of the foregoing aspects, the machine-readable instructions include instructions to detect a hidden process by comparing entries of a first list that lists all processes with entries of a second list that lists scheduled processes.

Figure 5:
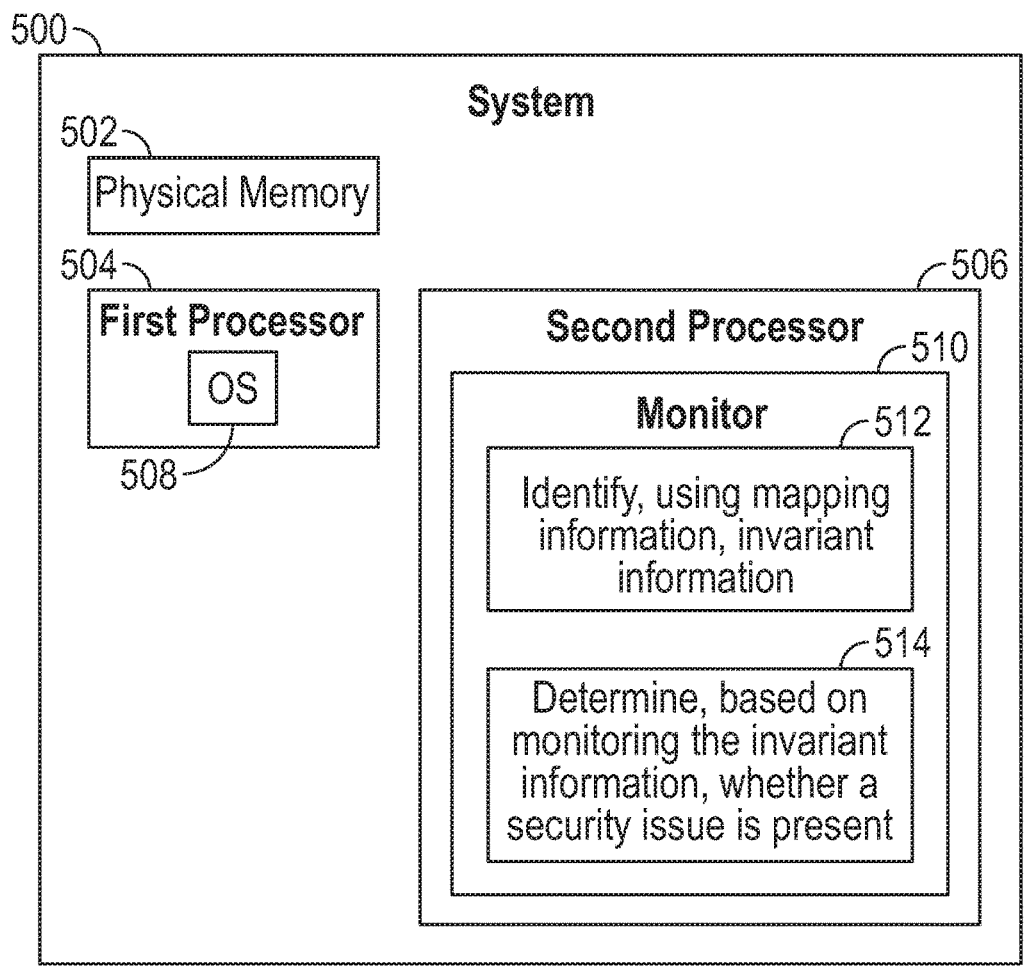
FIG. 5 is a block diagram of a system according to some examples.

FIG. 5 is a block diagram of a system 500, which can be implemented using a computer or multiple computers. The system 500 includes a physical memory 502, a first processor 504, a second processor 506, and an OS 508 executable on the first processor 504, the OS 508 to use mapping information in accessing data in the physical memory, where the mapping information maps virtual addresses to physical addresses of the physical memory.

A monitor 510 is executable on the second processor 506 that is different from the first processor 504 to perform various tasks.

The monitor 510 is executable to identify (512), using the mapping information, invariant information including program code of the OS 508 without suspending execution of the OS 508, the identifying based on the monitor accessing the physical memory 502 independently of the OS 508.

The monitor 510 is executable to determine (514), based on monitoring the invariant information of the OS, whether a security issue is present.

In some examples that may be in combination with any of the foregoing aspects, the monitor 510 is executable on the second processor 506 to receive, from an agent that is part of the OS 508, metadata indicating a memory location of the mapping information, access the memory location based on the metadata to retrieve the mapping information, and identify a physical address of the invariant information using the retrieved mapping information.

Figure 6:
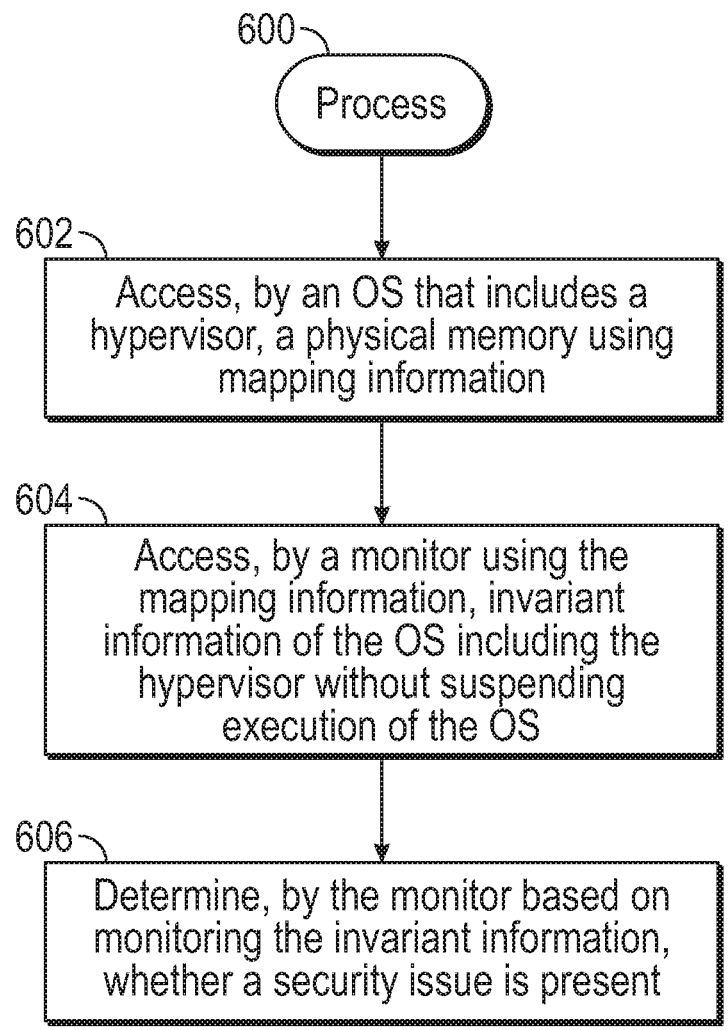
FIG. 6 is a flow diagram of a process according to further examples.

FIG. 6 is a flow diagram of a process 600 that can be performed by a computer system, such as computer system 100 in FIG. 1.

The process 600 includes accessing (at 602), by an OS that includes a hypervisor, a physical memory using mapping information that maps virtual addresses to physical addresses of the physical memory.

The process 600 includes accessing (at 604), by a monitor using the mapping information, invariant information of the OS including the hypervisor without suspending execution of the OS.

The process 600 includes determining (at 606), by the monitor based on monitoring the invariant information of the OS including the hypervisor, whether a security issue is present.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   execute a monitor separate from an operating system (OS) that uses mapping information in accessing data in a physical memory, wherein the mapping information maps virtual addresses to physical addresses of the physical memory;
   receive, by the monitor from an agent, metadata indicating a storage location of the mapping information;
   access, by the monitor without suspending execution of the OS, the mapping information using a virtual address in the metadata, the virtual address related to invariant information comprising program code of the OS;
   receive, by the monitor, a physical address translated by the mapping information from the virtual address;
   access, by the monitor, a memory location specified by the physical address to retrieve the invariant information of the OS from the physical memory independently of the OS; and
   determine, by the monitor based on monitoring the invariant information of the OS, whether a security issue is present.

2. The non-transitory machine-readable storage medium of claim 1, wherein the access of the memory location comprises the monitor accessing the physical memory directly over an interconnect independently of the OS.

3. The non-transitory machine-readable storage medium of claim 1, wherein the metadata comprises a virtual memory map that indicates portions of a virtual address space that are assigned for respective uses by the OS, and wherein determining whether the security issue is present is further based on the virtual memory map.

4. The non-transitory machine-readable storage medium of claim 1, wherein the metadata comprises a virtual address of critical information of the OS or of static information of the OS, wherein the invariant information monitored by the monitor comprises the critical information or the static information.

5. The non-transitory machine-readable storage medium of claim 1, wherein the metadata comprises a page frame management data structure comprising information for page frames, wherein the invariant information monitored by the monitor comprises a page frame.

6. The non-transitory machine-readable storage medium of claim 1, wherein the instructions upon execution cause the system to:
   detect new executable code; and
   determine that an attack is occurring responsive to:
      detecting that the new executable code is corrupted based on the metadata, or
      detecting that the new executable code is within or outside of a specified virtual address region.

7. The non-transitory machine-readable storage medium of claim 1, wherein determining whether the security issue is present comprises comparing a hash value of the invariant information at runtime of the OS to a baseline hash value of the invariant information.

8. The non-transitory machine-readable storage medium of claim 1, wherein the instructions upon execution cause the system to:
   use a process descriptor to verify an integrity of an OS process.

9. The non-transitory machine-readable storage medium of claim 1, wherein the instructions upon execution cause the system to:
   detect a hidden process by comparing entries of a first list that lists all processes with entries of a second list that lists scheduled processes.

10. A system comprising:
    a physical memory;
    a first processor;
    a second processor;
    an operating system (OS) executable on the first processor, the OS to use mapping information in accessing data in the physical memory, wherein the mapping information maps virtual addresses to physical addresses of the physical memory;
    a monitor executable on the second processor that is different from the first processor to:
       receive, from an agent, metadata indicating a storage location of the mapping information;
       access, without suspending execution of the OS, the mapping information using a virtual address in the metadata, the virtual address related to invariant information comprising program code of the OS;
       receive, at the monitor, a physical address translated by the mapping information from the virtual address;
       access a memory location specified by the physical address to retrieve the invariant information of the OS from the physical memory independently of the OS; and
       determine, based on monitoring the invariant information of the OS, whether a security issue is present.

11. The system of claim 10, wherein the metadata comprises a virtual memory map that indicates portions of a virtual address space that are assigned for respective uses by the OS, and wherein determining whether the security issue is present is further based on the virtual memory map.

12. The non-transitory machine-readable storage medium of claim 1, wherein executing the monitor separately from the OS comprises executing the monitor on a first processor and executing the OS on a second processor.

13. The non-transitory machine-readable storage medium of claim 1, wherein the OS includes a hypervisor, and the determining comprises determining whether the security issue is present with the hypervisor, and wherein the monitor is a non-hypervisor-based monitor.

14. The non-transitory machine-readable storage medium of claim 1, wherein the monitoring of the invariant information is performed without making a copy of the mapping information.

15. The non-transitory machine-readable storage medium of claim 1, wherein the instructions upon execution cause the system to:
    detect an attack of the mapping information.

16. The non-transitory machine-readable storage medium of claim 15, wherein the detecting of the attack of the mapping information is based on detecting that an entry of the mapping information has a privilege level different from a predetermined privilege level or that the entry of the mapping information has a mode different from a predetermined mode.

17. The non-transitory machine-readable storage medium of claim 1, wherein the agent is part of the OS.

18. The system of claim 10, wherein the monitor is executable on the second processor to:
    detect an attack of the mapping information.

19. The system of claim 18, wherein the detecting of the attack of the mapping information is based on detecting that an entry of the mapping information has a privilege level different from a predetermined privilege level or that the entry of the mapping information has a mode different from a predetermined mode.

\* \* \* \* \*